United States Patent [19]

An et al.

[11] Patent Number: 5,028,347

[45] Date of Patent: Jul. 2, 1991

[54] FLAME - RETARDANT MAGNETIC COMPOSITE RESIN COMPOSITION

[75] Inventors: Tae W. An; Jae K. Kim; Kyung N. Park; Jae K. Seo, all of Seoul, Rep. of Korea

[73] Assignees: Tong Yang Nylon Co. Ltd.; Tong Yang Polyester Co., Ltd., both of Rep. of Korea

[21] Appl. No.: 379,815

[22] Filed: Jul. 14, 1989

[30] Foreign Application Priority Data

May 19, 1989 [KR] Rep. of Korea ................. 89-6688

[51] Int. Cl.$^5$ ..................... H01F 1/28; C09K 21/06
[52] U.S. Cl. ................... 252/62.54; 252/609
[58] Field of Search ............. 252/62.54, 609, 610, 252/611

[56] References Cited

U.S. PATENT DOCUMENTS

| | | | |
|---|---|---|---|
| 2,705,227 | 3/1955 | Stamatoff | 524/781 |
| 4,271,234 | 6/1981 | Schonafinger et al. | 252/62.56 |
| 4,321,189 | 3/1982 | Ohshita et al. | 252/609 |
| 4,399,246 | 8/1983 | Hyde | 524/169 |
| 4,490,498 | 12/1984 | Yokota et al. | 524/371 |
| 4,593,058 | 6/1986 | Talley | 524/122 |
| 4,606,853 | 8/1986 | Williams | 252/609 |
| 4,696,774 | 9/1987 | Telschow | 562/828 |
| 4,729,854 | 3/1988 | Miyata et al. | 252/609 |
| 4,743,644 | 5/1988 | Skipper et al. | 252/609 |

FOREIGN PATENT DOCUMENTS

| | | | |
|---|---|---|---|
| 3424147 | 1/1986 | Fed. Rep. of Germany | 252/609 |
| 58-41643 | 3/1983 | Japan. | |
| 2139633 | 11/1984 | United Kingdom | 252/609 |

OTHER PUBLICATIONS

Kirk–Othmer, *Encyclopedia of Chemical Technology*, 3rd Ed., vol. 10, John Wiley-Sons, 1980 p. 380.

*Primary Examiner*—Gary P. Straub
*Assistant Examiner*—Stephen G. Kalinchak
*Attorney, Agent, or Firm*—Leydig, Voit & Mayer

[57] ABSTRACT

A flame-retardant magnetic composite resin composition is provided which comprises 10 to 50% by weight of a binder resin mixture containing 100 parts by weight of a polyamide resin and suitable amounts of the following components (A) to (G), and 50 to 90% by weight of a magnetic powder of which the surface is treated with a surface-modifying agent.

| | | |
|---|---|---|
| (A) | Phenol | 0.01 to 2.0 parts by weight |
| (B) | Thiophosphate compound | 0.001 to 0.5 parts by weight |
| (C) | Copper compound (based on copper content) | 0.0001 to 0.05 parts by weight |
| (D) | Bromine or nitrogen containing flame-retardant agent | 10 to 30 parts by weight |
| (E) | Flame-retardant synergist | 2.5 to 7.5 parts by weight |

The composition of the present invention, which is endowed with a high heat resistance and significantly improved physical properties and processability, may also include 0.001 to 0.5 parts by weight of an alkali metal halogenide compound and 0.2 to 1.0 parts by weight of a lubricant.

13 Claims, No Drawings

FLAME - RETARDANT MAGNETIC COMPOSITE RESIN COMPOSITION

TECHNICAL FIELD OF THE INVENTION

The present invention relates to a magnetic composite resin composition having good flame-retardant properties. More particularly, the present invention relates to a magnetic resin composition exhibiting a high flame retardance level achieved by adding a flame-retardant agent and a flame-retardant synergist to a magnetic composite resin consisting of a polyamide thermoplastic resin and a magnetic powder.

BACKGROUND OF THE INVENTION

Known conventional permanent magnets include an alnico magnet as a casting magnet, a sintered ferrite magnet utilizing iron oxide, a rare earth metal magnet utilizing a transition metal, and the like. Among these magnets, a sintered ferrite magnet has been widely used in the field of household electric appliances, electronic equipment and heavy electric equipment.

However, in recent times electronic equipment require miniaturization and accuracy together with high performance and confidence. However, since the magnets prepared from a conventional permanent magnet have a simple shape and low dimensional stability, they cannot satisfy the above-mentioned requirements. Therefore, in order to overcome the limitations of permanent magnets and obtain complicated and various shapes and good dimensional stability, plastic magnets have been generally used.

Meanwhile, in the recent electric or practical electronic fields efforts to provide a flame-retardant property to plastic magnets as above have continued. Thus, when the plastic is contacted with flame, the so-called UL-94 standard which requires that flaming time and glowing time reach a certain level, should be satisfied.

Developments of such technique are revealed in some patents, for example, U.S. Pat. No. 4,490,498. In this patent, a polyolefin resin such as polypropylene powder was used as a binder resin, and a composition consisting of a halogen flame-retardant agent such as decabromodiphenyl ether, antimony trioxide, zinc borate hydrate and magnetic ferrite powder was utilized. The characteristic of this technique resides in improving a glowing combustion resistance by adding zinc borate hydrate.

In addition, in Japanese Patent Publication No. (sho)58-41643 a copolymer of hexamethylene adipamide and ε-caprolactam as a binder resin with ferrite was used. In the detailed description of the invention of this Japanese Patent it was disclosed that a halogen-base or nitrogen-base flame-retardant agent can provide a flame-retardant property.

However, the method of the above U.S. Patent is not suitable for use in electric or electronic products due to the intrinsic heat resistance limit of olefin resins including polypropylene and further to their insufficient mechanical strength. The technique of the Japanese Patent Publication the disadvantages that the dispersibility of magnetic powder is low and, therefore, deterioration of physical properties is serious, in addition to the disadvantages as mentioned above.

Accordingly, the present inventors have conducted extensive research to overcome the disadvantages of the prior techniques and thus have discovered a novel flame-retardant magnetic composite resin composition which has an improved heat resistance, does not show deterioration of physical properties by addition of a flame-retardant agent, and has significantly improved physical properties and processability due to good dispersibility of magnetic powder.

BRIEF SUMMARY OF THE INVENTION

The composition of the present invention will be specifically illustrated below. The flame-retardant magnetic composite resin composition of the present invention is composed of 10 to 50% by weight of a binder resin mixture containing 100 parts by weight of a polyamide resin and suitable amounts of the following components (A) to (G), and 50 to 90% by weight of a magnetic powder of which the surface is treated with a surface-modifying agent.

| | | |
|---|---|---|
| (A) | Phenol derivative | 0.01 to 2.0 parts by weight |
| (B) | Thiophosphate compound | 0.001 to 0.5 parts by weight |
| (C) | Copper compound (based on copper content) | 0.0001 to 0.05 parts by weight |
| (D) | Alkali metal halogenide compound (based on alkali metal content) | 0.001 to 0.5 parts by weight |
| (E) | Flame-retardant agent | 10 to 30 parts by weight |
| (F) | Flame-retardant synergist | 2.5 to 7.5 parts by weight |
| (G) | Lubricant | 0.2 to 1.0 parts by weight |

As a polyamide resin used in the composition of the present invention, polymers such as nylon 6, nylon 66, nylon 12, nylon 11, nylon 6/66 copolymer, nylon 6/12 copolymer, nylon 66/12 copolymer, etc., may be used.

Among components added to the polyamide resin, a phenol derivative is added for inhibition of the activation of radicals formed by thermolysis and oxidation. For this purpose, it is preferable to use phenol derivatives with a hydroxy group of high steric hindrance and with low volatility at high temperature. Specific examples are N, N'-hexamethylene-bis(3,5-di-tert.-butyl- 4-hydroxy- hydrocinnamide), 3,6-oxy-1,8-octanediyl-bis(3-(4-hydroxy-3-methyl-5-tert.-butyl)propionate), 1,3,5-trimethyl-2,4,6-tris(3,5-di-tert.-butyl-4-hydroxybenzyl)benzene, tetrakis(methylene-3-(3,5-di-tert.-butyl-4-hydroxyphenyl)propionate)methane, and the like.

A thiophosphate compound is added for removing the radical-forming source by decomposing the peroxides formed by oxidation. Specific examples of the thiophosphate compound are triphenylthiophosphate, tri(2,4-dimethylphenyl) thiophosphate, triglycylthiophosphate, triisooctylthiophosphate, tri-2-ethylhexylthiophosphate, phenyldiethylthiophosphate, di(2-ethylhexyl) thiophosphate, phenyldicyclohexylthiophosphate, isooctyldiphenylthiophosphate, ethylenephenylthiophosphate, and the like.

In addition, as a copper compound for forming a complex with amide group, compounds having a good compatibility with molten polyamide, for example, copper acetate, cupric chloride, cupric bromide, cupric iodide, copper naphthenate, and the like, may be used.

A metal halogenide or halide compound is preferably added for obtaining the inhibiting effect of gel formation of polymer. For this purpose, potassium bromide, sodium bromide, potassium iodide, sodium iodide, and the like, are suitable.

As examples of a flame-retardant agent added to the polyamide resin of the present invention, an organic halide or nitrogen compound such as melamine, a organic halogenide flame-retardant agent such as decabromodiphenyloxide, octabromodiphenyloxide, polydibromophenyleneoxide, bromopolystyrene, and the like, may be mentioned.

In the present invention, antimony trioxide, barium metaborate monohydrate, and the like, may be used as a flame-retardant synergist.

The flame-retardant agent and flame-retardant synergist are preferably used within the above-mentioned range. If only one of these two components is added, it is difficult to obtain the desired flame retardant property of UL-94 V-0 level since the cotton flaming due to dripping occurs.

Meanwhile, in the present invention a lubricant, preferably a sulfur compound-containing lubricant is added in an amount of 0.2 to 1.0 parts by weight with respect to the binder resin. Such lubricant shortens processing time by improving the flow of molten polymer in the process and making easier the release of molded product, and further may have the effect of making the surface of thermoplastic resinous molded product smooth. The lubricant having such effects and the surface-treating agent to be explained hereinafter contribute to obtain good processability by the synergistic effect thereof.

In the present invention, the magnetic powder is subjected to a surface treatment with a surface-modifying agent. Such surface treatment has the effect of improving the dispersibility of magnetic powder and further increasing the dispersibility and compatibility of the binder resin with the flame-retardant agent, and therefore, improves the mechanical strength and flowability of the flame-retardant magnetic composite resin.

The magnetic powder pre-treated with the surface-modifying agent as above is preferably incorporated in an amount of 50 to 90% by weight of the composition containing the binder resin and the magnetic powder. The reason is that in the case of less than 50% by weight being used, the desired magnetic properties cannot be obtained, on the other hand, in the case of more than 90% by weight being used, the kneading procedure itself is difficult to carry out.

The magnetic powder as above includes ferrite powder or rare earth metal powder such as samarium-cobalt. These magnetic powders may be used singly or in combination of two or more, according to applications of the final composition. Particularly, a light ferrite such as 6BaOFe$_2$O$_3$ or 6SrOFe$_2$O$_3$ is widely used in the industrial field.

As a surface-modifying agent used in the present invention, silanes, titanates, zircoaluminates, or the like, may be mentioned. A silane surface-modifying agent may be represented by the general formula R(CH$_2$)$_n$SiX$_3$ in which R is

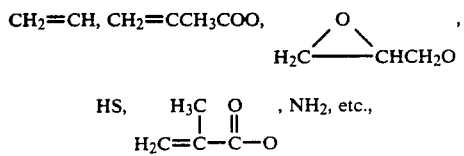

and X is a hydrolysable group such as Cl, OCH$_3$, OC$_2$H$_5$, OC$_2$H$_4$OCH$_3$, etc.

In addition, in the present invention a titanate surface-modifying agent may be represented by the general formula RO-Ti(O-R')$_3$. In this formula, R denotes

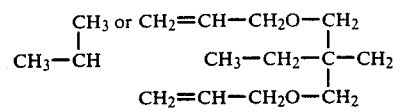

and R' denotes C$_2$H$_4$-NH-C$_2$H$_4$-NH$_2$,

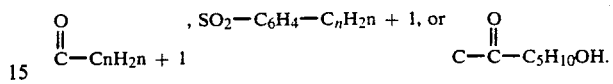

Meanwhile, as a zircoaluminate surface-modifying agent the compound having the following structure may be used.

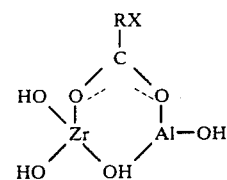

(in which R represents an alkyl group and X represent NH$_2$, COOH, SH, etc.)

The silane, titanate or zircoaluminate surface-modifying agent is preferably added in an amount of 0.5 to 2.0 parts by weight based on 100 parts by weight of the ferrite and is used with dilution with a lower alcohol, such as methanol, ethanol, isopropanol, etc., or an aqueous solution thereof. In this case, the ratio of surface-modifying agent and lower alcohol is preferably in the range of 1:1 to 1:5. The magnetic powder is pre-treated by mixing the magnetic powder with the diluted solution as above in a mixer at 1000 to 2000 rpm for 5 to 20 minutes.

The magnetic powder, binder resin and other additives according to the present invention are prepared in pellet form by kneading them with conventional biaxial kneader. The purpose and effect of the flame-retardant magnetic composite resin according to the present invention will be made more clear by the working examples provided hereinafter. Specifically, the flame-retardant magnetic composite resin of the present invention is capable of lightening the molded product in comparison with a sintered magnet and has an excellent dimensional stability and moldability, and furthermore may reach UL-94 V-0 level of the flame retardance.

In addition, in the composite resin of the present invention the deterioration of physical properties due to the addition of flame-retardant agent is prevented, and the dispersibility of magnetic powder and the processibility are improved. Further, by using a polyamide resin having a superior heat resistance as a binder resin, the flame-retardant magnetic composite resin of the present invention inhibits the activation of radicals formed by thermolysis and oxidation and prevents the gel formation of polymer. Additionally, in the present invention, by the synergistic action of lubricant and surface-modifying agent, the release of molded product in the post-processing is made easier and the surface of the molded product is smooth and the flow of molten polymer is improved.

DETAILED DESCRIPTION

Hereinafter the present invention will be explained in more detail by way of examples that follow, to which the present invention is in no way limited.

EXAMPLE 1

A composite resin composition consisting of 30% by weight of a binder resin mixture comprising 100 parts by weight of nylon 6 binder resin mixed with 0.5 parts by weight of N, N'-hexamethylenebis(3,5-di-tert.-butyl-4-hydroxyhydrocinnamide), 0.01 parts by weight of copper acetate, 0.2 parts by weight of potassium iodide and 0.3 parts by weight of triphenylthiophosphate, 20 parts by weight of polydibromophenyleneoxide, 4 parts by weight of antimony trioxide and 0.5 parts by weight of benzene butyl sulfonamide and 70% by weight of a magnetic powder, which is prepared by pre-treating 100 parts by weight of barium ferrite powder having an average particle diameter of 1.3µ and a compressed density of 3.3 g/cm³, with 1 part by weight of Y-amino propyl triethoxy silane, is introduced into a biaxial kneader and kneaded at the processing temperature of 200° C. to 270° C., while charging the interior of cylinder of the kneader with nitrogen gas, to produce pellets. The resulting pellets are molded by an injection molding machine equipped with a mold for a 1/16 inch UL flame-retardant test sample to obtain test samples which are then subjected to the UL-94 flame retardant test method. The results of the flame-retardant test are superior and are reported in Table 1.

EXAMPLES 2–11 AND COMPARATIVE EXAMPLES 1–3

In the same manner to the procedure of Example 1, test samples are prepared by varying the kind and contents of the binder resin and flame-retardant agent and by using the zircoaluminate of the following structure as a surface-modifying agent.

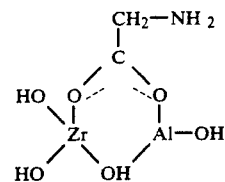

The test results under such conditions are reported in Table 1 together with the results obtained in Example 1.

As shown in the comparative examples, if the content of flame-retardant agent is less than a certain level, the flame retardance is significantly decreased, and when nylon 66 is used together with a melamine flame-retardant agent, it can be seen that unless barium metaborate monohydrate is concurrently used, the cotton flaming due to dripping occurs.

TABLE 1

| Examples | Ferrite content (wt %) | resin mixture content (wt %) | Binder resin (parts by weight) nylon 6 | nylon 66 | Flame-retardant agent (parts by weight) DBDPO | BPS | PDBPO | Melamine | Flame-retardant synergist (parts by weight) Sb₂O₃ | BMBMH | Total flaming time (sec.) | glowing time (sec.) | Cotton flaming | UL-94 |
|---|---|---|---|---|---|---|---|---|---|---|---|---|---|---|
| Example |  |  |  |  |  |  |  |  |  |  |  |  |  |  |
| 1 | 70 | 30 | 100 | — | — | — | 20 | — | 4 | — | 40 | 20 | X | V-0 |
| 2 | 70 | 30 | 100 | — | 25 | — | — | — | 5 | — | 20 | 10 | X | V-0 |
| 3 | 70 | 30 | 100 | — | 20 | — | — | — | 4 | — | 25 | 14 | X | V-0 |
| 4 | 70 | 30 | 100 | — | 30 | — | — | — | 6 | — | 10 | 7 | X | V-0 |
| 5 | 70 | 30 | 100 | — | — | 25 | — | — | 5 | — | 30 | 20 | X | V-0 |
| 6 | 70 | 30 | 100 | — | — | 20 | — | — | 4 | — | 45 | 25 | X | V-0 |
| 7 | 60 | 40 | — | 100 | 25 | — | — | — | 5 | — | 17 | 10 | X | V-0 |
| 8 | 60 | 40 | — | 100 | 20 | — | — | — | 4 | — | 34 | 12 | X | V-0 |
| 9 | 60 | 40 | — | 100 | — | 25 | — | — | 5 | — | 30 | 20 | X | V-0 |
| 10 | 60 | 40 | — | 100 | — | 20 | — | — | 4 | — | 40 | 24 | X | V-0 |
| 11 | 60 | 40 | — | 100 | — | — | — | 30 | — | 5 | 45 | 25 | X | V-0 |
| Comparative Example |  |  |  |  |  |  |  |  |  |  |  |  |  |  |
| 1 | 60 | 40 | — | 100 | 9 | — | — | — | 2 | — | 55 | 31 | X | V-1 |
| 2 | 60 | 40 | — | 100 | — | — | — | 30 | — | — | 45 | 30 | O | V-2 |
| 3 | 60 | 40 | — | 100 | — | 20 | — | — | — | — | 52 | 31 | X | V-1 |

*Remarks:
DBDPO (decabromodiphenyloxide),
BPS (bromopolystyrene),
BMBMH (barium metaborate monohydrate),
PDBPO (polydibromophenyleneoxide),
O (cotton flaming occured),
X (cotton flaming did not occur)

EXAMPLE 12 AND COMPARATIVE EXAMPLES 4–5

Test samples are prepared in the same manner as the procedure of Example 1, except that as a binder resin, nylon resin containing a phenol derivative, thiophosphate compound, copper compound, alkali metal halogenide compound, or the like (hereinafter referred to as "heat-resistant nylon resin"), or a conventional general nylon resin or a polypropylene resin is used. The test results are shown in Table 2.

TABLE 2

| Examples | Binder resin | Heat distortion temperature (66 psi, °C.) |
|---|---|---|
| Example 12 | Heat-resistant nylon resin | 220 |

TABLE 2-continued

| Examples | Binder resin | Heat distortion temperature (66 psi, °C.) |
|---|---|---|
| Comparative Example 4 | General nylon resin | 170 |
| Comparative Example 5 | Polypropylene resin | 140 |

EXAMPLE 13 AND COMPARATIVE EXAMPLES 6-7

Test samples are prepared in the same manner as the procedure of Example 1, excepting that as a surface-modifying agent isopropyl tri(N-ethylene diamino) ethyl titanate is used and the amount used thereof is varied. For the test samples, the kneading processabilities are compared. ASTM test samples are prepared by using an injection molding machine equipped with a mold for ASTM test sample and mechanical strengthes thereof are determined. The results obtained are shown in Table 3.

TABLE 3

| Examples | Ferrite (wt %) | Binder resin (wt %) | Surface-modifying agent (phf)*1 | Motor loading of kneader (A)*2 | Extruding granulation property*3 | Melt Index | Impact Strength (kg/cm²) | Elongation Strength (kg/cm²) |
|---|---|---|---|---|---|---|---|---|
| Example 13 | 90 | 10 | 1.0 | 14 | O | 30 | 6 | 1000 |
| Comparative Example 6 | 90 | 10 | 0.5 | 18 | Δ | 20 | 4 | 900 |
| Comparative Example 7 | 90 | 10 | 0.0 | 25 | X | 10 | 2 | 850 |

*1phf (part per hundred ferrite: weight)
*2A (Ampere)
*3The surface of granulation is smooth and lustrous (O), rough and easy to break (X), between the above O and X (Δ)

EXAMPLE 14 AND COMPARATIVE EXAMPLE 8

The same procedure as that of Example 1 is carried out with and without the benzene butyl sulfonamide as a lubricant. The results are shown in Table 4.

TABLE 4

| Examples | Ferrite (wt %) | Binder resin (wt %) | Lubricant (phr)*4 | Motor loading of kneader (A) | Melt Index | Injection Temperature (°C.) | Injection Pressure (kg/cm²) |
|---|---|---|---|---|---|---|---|
| Example 14 | 80 | 10 | 0.5 | 10 | 40 | 210–230 | 70 |
| Comparative Example 8 | 90 | 10 | 0.0 | 14 | 30 | 220–250 | 100 |

*4phr (part per hundred resin: weight)

What is claimed is:

1. A flame-retardant magnetic resin composition meeting UL-94, V-0 test standards comprising: 10 to 50% by weight of a binder resin mixture containing 100 parts by weight of a polyamide resin and
    (A) 0.01 to 2.0 parts by weight of a phenol derivative which is N, N'-hexamethylenebis(3,5-di-tert.-butyl-4-hydroxyhydrocinnamide), 3,6-oxy-1,8-octanediylbis(3-(4-hydroxy-3-methyl-5-tert.-butyl)propionate), 1,3,5-trimethyl-2,4,6-tris(3,5-di-tert.-butyl-4-hydroxybenzyl)benzene, or tetrakis(-methylene-3-(3,5-di-tert.-butyl-4-hydroxyphenyl)-propionate)methane;
    (B) 0.001 to 0.5 parts by weight of a thiophosphate compound which is triphenylthiophosphate, tri(2,4-dimethylphenyl) thiophosphate, triglycylthiophosphate, triisooctylthiophosphate, tri-2-ethylhexylthiophosphate, phenyldiethylthiophosphate, di(2-ethylhexyl) thiophosphate, phenyldicyclohexylthiophosphate, isooctyldiphenylthiophosphate, or ethylenephenylthiophosphate;
    (C) 0.0001 to 0.05 parts by weight, based on copper content, of a copper compound which is copper acetate, cupric chloride, cupric bromide, cupric iodide, or copper naphthenate which forms a complex with the amide groups of the polyamide resin;
    (D) 10 to 30 parts by weight of a bromine or nitrogen containing flame-retardant agent which is melamine, decabromodiphenyloxide, octabromodiphenyloxide, polydibromophenyleneoxide, or bromopolystyrene;
    (E) 2.5 to 7.5 parts by weight of a flame-retardant synergist which is antimony trioxide or barium metaborate monohydrate; and
50 to 90% by weight of a magnetic powder the surface of which is treated with an effective amount of a surface-modifying agent for improving the dispersibility of the magnetic powder and other components of the composition.

2. The flame-retardant magnetic resin composition according to claim 1, wherein said polyamide resin is selected from the group consisting of nylon 6, nylon 66, nylon 12, nylon 11, nylon 6/66, nylon 6/12 and nylon 66/12.

3. The flame-retardant magnetic resin composition according to claim 1, wherein said surface-modifying agent is silanes, titanates or zircoaluminates.

4. The flame-retardant magnetic resin composition according to claim 1 further including 0.2 to 1.0 parts by weight of a lubricant for improving the flowability of said resin.

5. The flame-retardant magnetic resin composition according to claim 1 further including 0.001 to 0.5 parts by weight, based on alkali metal content, of an alkali metal halogenide compound for inhibiting the effect of gel formation of the polymer.

6. A flame-retardant magnetic resin composition meeting UL-94, V-0 test standards comprising: 10 to 50% by weight of a binder resin mixture contaiing 100 parts by weight of a polyamide resin wherein said polyamide resin is selected from the group consisting of nylon, nylon 66; and (A) 0.01 to 2.0 parts by weight of a phenol derivative which is N, N'-hexamethylenebis(3,5-di-tert.-butyl-4-hydroxyhydrocinnamide), 3,6-oxy-1,8-octanediylbis(3-(4-hydroxy-3-methyl-5-tert.-butyl)propionate), 1,3,5-trimethyl-2,4,6-tris(3,5-di-tert.-butyl-4-hydroxybenzyl)benzene, or tetrakis(-methylene-3-(3,5-di-tert.-butyl-4-hydroxyphenyl)-propionate)methane;

(B) 0.001 to 0.5 parts by weight of a thiophosphate compound which is triphenylthiophosphate, tri(2,4-dimethylphenyl) thiophosphate, triglycylthiophosphate, triisooctylthiophosphate, tri-2-ethylhexylthiophosphate, phenyldiethylthiophosphate, di(2-ethylhexyl) thiophosphate, phenyldicyclohexylthiophosphate, isooctyldiphenylthiophosphate, or ethylenephenylthiophosphate;

(C) 0.0001 to 0.05 parts by weight, based on copper content, of a copper compound which is copper acetate, cupric chloride, cupric bromide, cupric iodide, or copper naphthenate which forms a complex with the amide groups of the polyamide resin;

(D) 10 to 30 parts by weight of a bromine or nitrogen containing flame-retardant agent which is melamine, decabromodiphenyloxide, octabromodiphenyloxide, polydibromophenyleneoxide, or bromopolystyrene;

(E) 2.5 to 7.5 parts by weight of a flame-retardant synergist selected from the group consisting of antimony trioxide or barium metaborate monohydrate; and 50 to 90% by weight of a magnetic powder the surface of which is treated with an effective amount of a surface-modifying agent selected from silanes, titanates or zircoaluminates for improving the dispersibility of the magnetic powder and other components of the composition.

7. The flame-retardant magnetic resin composition according to claim 6 further including 0.2 to 1.0 parts by weight of a sulfur compound-containing lubricant.

8. The flame-retardant magnetic resin composition according to claim 6 further including 0.001 to 0.5 parts by weight, based on alkali metal content, of an alkali metal halogen salt selected from the group consisting of: potassium bromide, sodium bromide, potassium iodide and sodium iodide.

9. A flame-retardant magnetic resin composition meeting UL-94, V-0 test standards comprising:

30% by weight of a binder resin mixture containing 100 parts by weight of nylon 6 and (A) 0.5 parts by weight of N,N' hexamethylenebis (3,5 tertbutyl-4-hydroxyhydrocinnamide);

(B) 0.3 parts by weight of triphenylthiophosphate;

(C) 0.01 parts by weight of copper acetate (based on copper content);

(D) 0.2 parts by weight of potassium iodide (based on alkali metal content);

(E) 20 parts by weight of polydibromophenylene oxide;

(F) 4 parts by weight of antimony trioxide;

(G) 1 part by weight of γ-aminopropyl triethoxy silane;

(H) 0.5 parts by weight of benzene butyl sulfonamide; and

70% by weight of barium ferrite powder.

10. A flame-retardant magnetic resin composition according to claim 1 wherein said phenol derivative is N, N'-hexamethylene bis (3,5-di-tert butyl-4-hydroxyhydrocinnamide).

11. A flame-retardant magnetic resin composition according to claim 6 wherein said phenol derivative is N,N'-hexamethylene bis (3,5-di-tert butyl-4-hydroxyhydrocinnamide).

12. A flame-retardant magnetic resin composition according to claim 1 wherein said flame-retardant agent is polydibromophenylene oxide.

13. A flame-retardant magnetic resin composition according to claim 6 wherein said flame-retardant agent is polydibromophenylene oxide.

* * * * *